(12) United States Patent
Yang et al.

(10) Patent No.: US 12,020,207 B2
(45) Date of Patent: Jun. 25, 2024

(54) CANONICAL MODEL FOR PRODUCT DEVELOPMENT

(71) Applicant: Allstate Insurance Company, Northbrook, IL (US)

(72) Inventors: Kevin Yang, Fremont, CA (US); Hruday Kamble, Roseville, CA (US); Avinash Gupta, Roseville, CA (US)

(73) Assignee: ALLSTATE INSURANCE COMPANY, Northbrook, IL (US)

( * ) Notice: Subject to any disclaimer, the term of this patent is extended or adjusted under 35 U.S.C. 154(b) by 180 days.

(21) Appl. No.: 17/071,074

(22) Filed: Oct. 15, 2020

(65) Prior Publication Data

US 2024/0086844 A1 Mar. 14, 2024

Related U.S. Application Data

(60) Provisional application No. 62/915,251, filed on Oct. 15, 2019.

(51) Int. Cl.
| | | |
|---|---|---|
| *G06Q 10/101* | (2023.01) | |
| *G06F 16/21* | (2019.01) | |
| *G06F 16/25* | (2019.01) | |
| *G06Q 40/08* | (2012.01) | |

(52) U.S. Cl.
CPC ......... *G06Q 10/101* (2013.01); *G06F 16/212* (2019.01); *G06F 16/258* (2019.01); *G06Q 40/08* (2013.01); *Y10S 707/99941* (2013.01)

(58) Field of Classification Search
CPC ..... G06Q 10/101; G06Q 40/08; G06F 16/256
USPC ....................................................... 707/601
See application file for complete search history.

(56) References Cited

U.S. PATENT DOCUMENTS

| | | |
|---|---|---|
| 5,523,942 A | 6/1996 | Tyler et al. |
| 6,604,100 B1 | 8/2003 | Fernandez et al. |
| 6,687,873 B1 | 2/2004 | Ballantyne et al. |
| 7,089,583 B2 | 8/2006 | Mehra et al. |
| 7,284,196 B2 | 10/2007 | Skeen et al. |
| 7,395,255 B2 | 7/2008 | Li |
| 7,599,947 B1 | 10/2009 | Tolbert et al. |
| 8,099,382 B2 | 1/2012 | Liu et al. |
| 8,121,976 B2 | 2/2012 | Kalia et al. |
| 8,166,450 B2 | 4/2012 | Fuhler et al. |

(Continued)

OTHER PUBLICATIONS

2016, August 8, Emiel Paasschens, "Benefits of a Canonical Data Model (CDM) in a SOA Environment."

(Continued)

*Primary Examiner* — Allen S Lin
(74) *Attorney, Agent, or Firm* — Polsinelli PC

(57) ABSTRACT

Methods and systems disclosed herein describe a canonical model that sets forth a standardized schema that represents data entities and their relationships as a logical data structure across multiple business units. A schema validator module may validate application-specific schema against the canonical module. Additionally, legacy and/or existing applications may be upgraded, through a transformation module, to comply with the canonical model. The transformation module may transform application-specific data and/or information to the standardized schema, and vice versa, to ensure that legacy and/or existing applications may communicate with applications and/or processing engines that comply with the standardized schema.

20 Claims, 8 Drawing Sheets

(56) References Cited

U.S. PATENT DOCUMENTS

| | | |
|---|---|---|
| 8,495,098 B1 | 7/2013 | Kern et al. |
| 8,701,128 B2 | 4/2014 | Salt et al. |
| 8,744,879 B2 | 6/2014 | Bodansky et al. |
| 8,832,130 B2 | 9/2014 | Doddavula et al. |
| 8,850,057 B2 | 9/2014 | Natoli et al. |
| 8,886,591 B2 | 11/2014 | McDonald et al. |
| 9,135,226 B2 | 9/2015 | Sulistio et al. |
| 9,411,845 B2* | 8/2016 | Mathis ............... G06F 16/23 |
| 9,411,864 B2 | 8/2016 | Glider et al. |
| 9,417,890 B2 | 8/2016 | Reddish et al. |
| 9,418,127 B2 | 8/2016 | Xiong |
| 9,762,435 B2 | 9/2017 | Shelton et al. |
| 10,303,753 B2 | 5/2019 | Greenblatt et al. |
| 10,419,586 B2 | 9/2019 | Ritter et al. |
| 10,430,164 B2* | 10/2019 | Goja ..................... G06F 8/72 |
| 2004/0193455 A1 | 9/2004 | Keilington |
| 2006/0155529 A1 | 7/2006 | Ludviksson et al. |
| 2006/0236307 A1 | 10/2006 | Debruin et al. |
| 2007/0214020 A1 | 9/2007 | Srinivasan et al. |
| 2008/0091690 A1 | 4/2008 | Ellersick et al. |
| 2008/0222603 A1 | 9/2008 | Shaw et al. |
| 2012/0011067 A1* | 1/2012 | Katzin ................ G06Q 20/40 |
| | | 709/219 |
| 2015/0339370 A1* | 11/2015 | Onusko .............. G06F 16/284 |
| | | 707/722 |
| 2016/0285794 A1 | 9/2016 | Naidu |
| 2017/0220698 A1 | 8/2017 | Dietrich et al. |
| 2017/0243301 A1 | 8/2017 | Wang et al. |
| 2018/0027006 A1* | 1/2018 | Zimmermann ..... G06F 21/6218 |
| | | 726/11 |
| 2018/0150599 A1 | 5/2018 | Valdes et al. |
| 2019/0265971 A1 | 8/2019 | Behzadi et al. |
| 2020/0004575 A1 | 1/2020 | Bailey et al. |

OTHER PUBLICATIONS

2019, May 8, Brian Byrne, John Kling, "The Value of Applying the Canonical Modeling Pattern in SOA."

Apr. 18, 2005, G. Robinson; MJ Zhou, "Utility Applications Should be integrated with an Interface based on a Canonical Data Model, not directly with each other."

DWH—Models, "Data Wareouse Model for Insurance."

GrayMatter Software Services Pyt., Ltd., "Insurance Data Warehouse Model."

Pega Systems, Inc., "Pega Foundation for Insurance."

Sep. 12, 2017, Toan C. Ong-, "Dynamic ETL: a Hybrid Approach for Health Data Extraction, Transformation and Loading."

Aug. 5, 2017, Greg Marsh, "How to Build a Data Warehouse for the Insurance Industry."

Michal Dzmuran, "Introduction to Data integration Driven by a Common Data Model."

Oct. 27, 2021—(CA) Office Action—App 3,096,227, 5 Pages.

\* cited by examiner

CANONICAL MODEL FOR PRODUCT DEVELOPMENT

CROSS REFERENCE TO RELATED APPLICATIONS

This application claims priority to U.S. Provisional Application No. 62/915,251, filed on Oct. 15, 2019 and entitled "Canonical Model for Product Development," the entirety of which is hereby incorporated in its entirety by reference.

FIELD OF USE

Aspects of the disclosure relate generally to product development and, more specifically, to using a standardized object schema to develop products on new and legacy applications.

BACKGROUND

Corporations and enterprises may be comprised of a plurality of individual business units. Each individual business unit may have one or more applications to accomplish their objectives. For instance, the one or more applications may collect information, such as customer data. That information may be analyzed and processed to render a decision, product a product, or any equivalent thereof. In some instances, the information may be shared between applications. In this regard, a development team that supports the business unit may ensure that the business unit's applications follow a common schema, or format, for the data and information collected by each of the applications. The common schema may allow data and information to transition seamlessly between applications of a business unit.

In some instances, data and information may need to flow between business units and, in particular, to other applications in different business units. While the other applications may collect the same, or similar, data and information, the other applications may follow a different schema than the applications found in the originating business unit. Additionally, or alternatively, business units may have legacy applications which do not adhere to the schema employed across other applications. To address these issues, the data and information may be translated. However, translations may cause inconsistent formatting of the data and information, data duplication, and, in sonic cases, data corruption. Accordingly, there is a need to define an enterprise-wide schema for collecting data and information and transforming data and information such that the data and information adheres to the defined enterprise-wide schema.

Aspects described herein may address these and other problems, and generally improve the efficiency and performance of product and application development.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Example methods and systems described herein define a canonical model. The canonical model may define a schema, or common format, to allow (e.g., permit) communication between different data formats. Model methodologies may be considered either bottom-up or top-down. Bottom-up modelling methodologies may be the result of re-engineering and, typically, start with existing data structures. Bottom-up modelling may be physical and application-specific, and also incomplete from an enterprise-wide perspective. Top-down modelling, on the other hand, may be an abstract technique for gathering information from experts. In this regard, the system may not implement all the entities in a top-down logical model; however, the top-down logical model may serve as a reference point and/or template for enabling data of varying formats to be exchanged seamlessly.

The canonical model described herein sets forth a top-down logical model. Accordingly, the canonical model may define a standard schema that represents data entities (e.g., objects, classes, methods, libraries, etc.) and/or their relationships as a logical data structure across an enterprise and/or corporation. In particular, the standardized schema may be a common data format (e.g. design pattern or the like) that allows applications configured with different data formats to communicate between different formats. In this regard, the standardized schema may set a standard for message structure and content (e.g., payload). In operation, the data entities defined by the canonical model may be used to transform data and/or information throughout the data and/or information's lifecycle as the data and/or information passes between various applications and/or processing centers.

New applications may be written to adhere to the standard schema set forth by the canonical model. However, existing and/or legacy applications may not adhere to the canonical model. According to some embodiments, a schema validation module may determine whether an application's schema adheres to the canonical model. When the application's schema adheres to the canonical model, no further steps may be needed. However, when the application's schema does not adhere to the canonical model, an application may be updated. These updates may include updating the application's configuration file to ensure that the application's schema adheres to the canonical model. Additionally, or alternatively, the application may be updated to include a transformation module. The transformation module may be used, for example, when a legacy application communicates with an application and/or processing engine that adheres to the canonical model. In this regard, an application may obtain one or more inputs, via an application interface (e.g., user interface), in order to generate a product (e.g., an insurance quote, insurance policy, etc.) on behalf of a user. In addition to the one or more inputs, the application may define source/target information that includes the source application and/or the target information for the inputs. The one or more inputs and the source/target information may be provided to the transformation module. The transformation module may transform the one or more inputs and/or the source/target information from a first format into a second format. The one or more transformed inputs may then be mapped to the target application. After the one or more transformed inputs have been mapped to the target application, the one or more. transformed inputs may be further transformed in accordance with the canonical model. Once the one or more inputs adhere with the canonical model, a request may be made to one or more services. The request may include the one or more inputs that adhere to the canonical model. Additionally, the one or more services may be another application and/or processing engine.

Once the information is processed, the application and/or processing engine may transmit a response to the application. The response may include one or more outputs that adhere to the canonical model. Additionally, the response may define the source/target information collected by the application during the input stage. The application may transform the one or more outputs into a first format. Next, the application may map the one or more outputs to the source application. The application may then transform the one or more outputs from the first format into a second format, such as a document format (e.g., eXtensible Markup Language). After transforming the one or more outputs into the second format, the application may generate a product (e.g., an insurance quote, insurance policy, etc.) and merge the one or more outputs into the product.

Accordingly, the canonical model described herein may be an enterprise-wide schema for collecting, processing, and managing data and information. Additionally, the canonical model may allow validation and/or transformation modules to be developed and deployed that allow applications that format data and/or information differently to transforming data and/or information to a standardized format that minimizes inconsistent formatting, data duplication, and/or data corruption.

These features, along with many others, are discussed in greater detail below.

BRIEF DESCRIPTION OF THE DRAWINGS

The present disclosure is described by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods and techniques for deploying a canonical data model that defines a standard schema that represent data entities (e.g., objects, classes, methods, libraries, etc.) and/or their relationships as a logical data structure across an enterprise and/or corporation. Once a standard schema is defined, applications may be developed and/or configured to comply with the standard schema. Additionally, or alternatively, transformation modules may be developed and deployed to an application that allow the application to communicate and share data and/or information with other applications and/or processing engines that adhere to the canonical model.

Example methods and systems as described herein may include techniques for developing and deploying a canonical model that defines a standard schema that represents data entities (e.g., objects, classes, methods, libraries, etc.) and/or their relationships as a logical data structure across an enterprise and/or corporation. As part of the deployment of the canonical model, an application's schema may be validated, for example, by a validation module, for compliance with the canonical model. Additionally, or alternatively, a transformation module may be developed and/or deployed to existing and/or legacy applications. The transformation module may allow existing and/or legacy applications to communicate with applications and/or processing engines that adhere to the canonical model. As will be discussed in greater detail below, the transformation module may transform the data entities of existing and/or legacy applications into the standard schema (e.g., format) defined by the canonical model. The transformation module may also transform the data entities from the standard schema (e.g., format) into a format of the existing and/or legacy application. Accordingly, the existing and/or legacy application may use the data entities received from the applications and/or processing engine to generate a product (e.g., an insurance quote, an insurance policy, etc.).

Figure 1:
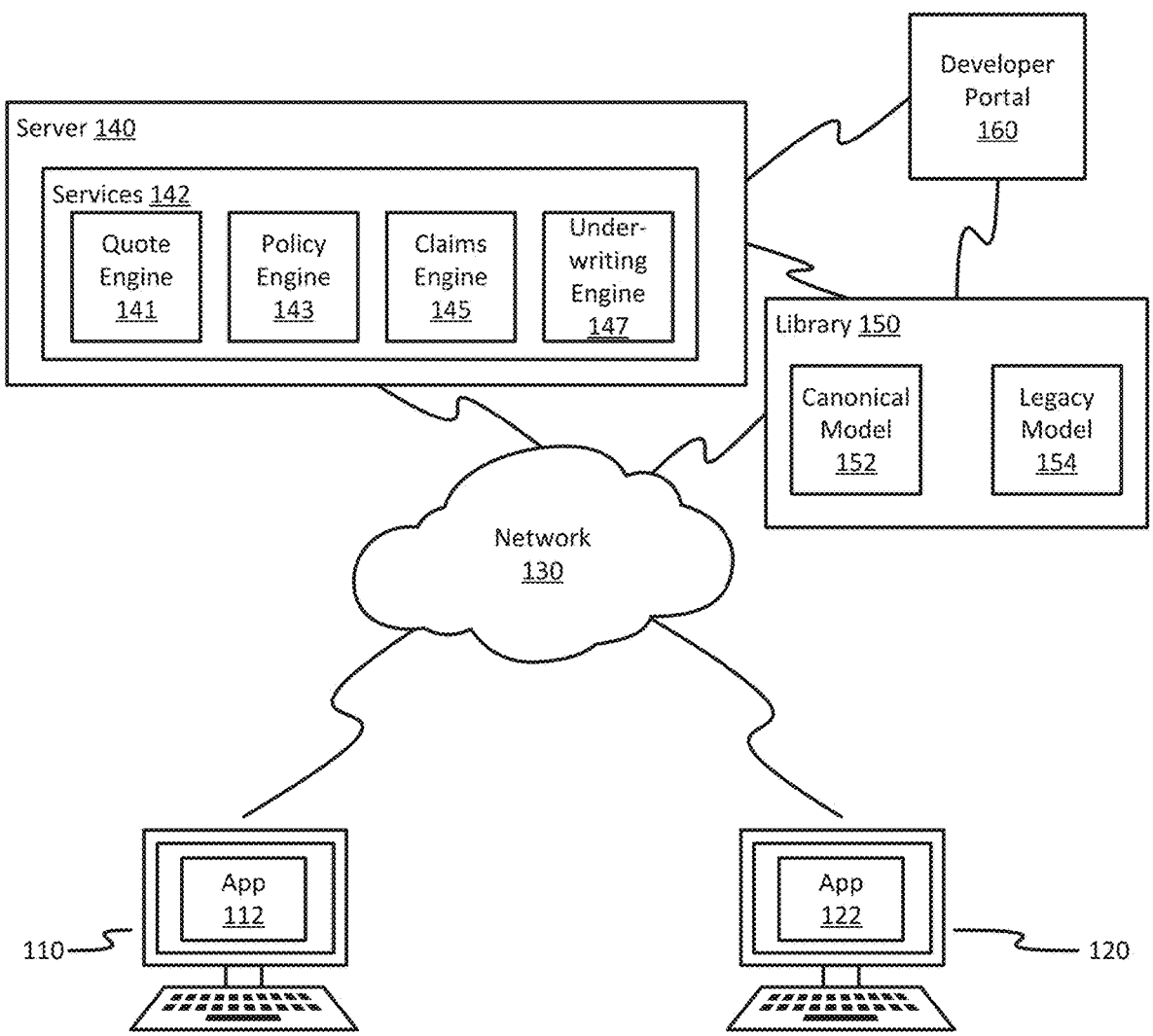
FIG. 1 shows an example of a system in which one or more aspects described herein may be implemented.

Turning to FIG. 1, a system 100 in which the canonical model may be deployed is shown. System 100 may include a first computing device 110 and a second computing device 120 interconnected to a server 140 and a library 150 via network 130. Additionally, server 140 and library 150 may be connected to a developer portal 160 through another network (not shown in FIG. 1).

First computing device 110 may be any suitable computing device configured to perform the particular functions described herein. For example, first computing device 110 may be a mobile device, such as a cellular phone, a mobile phone, a smart phone, a tablet, or a laptop, and/or a personal computer, such as a terminal computing device, a desktop computing device, etc. First computing device 110 may provide a first user with access to a variety of applications and services. For example, first computing device 110 may provide the first user with access to the Internet. Additionally, first computing device 110 may provide the first user with one or more applications located thereon, including, for example application 112. The one or more applications may provide the first user with a plurality of tools and access to a variety of services. For instance, application 112 may be a web browser that provides the first user with access to the Internet. The web browser may allow the first user to access one or more webpages, such as an insurance web page. On the insurance web page, the first user may be able to receive one or more rate quotes, insurance policies, etc. In this regard, insurance web page served to the first user via application 112 may include one or more inputs to collect data and/or information from the first user. The information may be transmitted to server 140 via network 130. As will be discussed in greater detail below, server 140 may process the data and/or information provided by the first user to generate one or more outputs. These one or more outputs may include, for example, one or more rate quotes, insurance policies, etc. Server 140 may return the one or more outputs to application 112, which may merge the data and/or information provided by the user with the one or more outputs provided by server 140 to generate a product, such as a rate quote, an insurance policy, etc.

Second computing device 120 may be similar to the first computing device 110 discussed above. In this regard, the second computing device 120 may include any suitable computing device configured to allow a user to execute software for a variety of purposes as described herein. Second computing device 120 may belong to the first user that accesses first computing device 110, or, alternatively, second computing device 120 may belong to a second user, different from the first user. The software of second computing device 120 may include one or more web browsers that provide access to websites on the Internet. Additionally, or alternatively, second computing device 120 may include an application 122. In some embodiments, application 122 may be an application used by a professional in the performance of their duties. For example, application 122 may be an insurance program configured to allow an insurance agent to provide quotes, insurance policies, etc. to clients. In this regard, an agent may enter one or more inputs into application 122. The one or more inputs may include data and/or information provided by the client. Application 122 may transmit (e.g., send) the one or more inputs to server 140 for processing. Based on the inputs, server 140 may provide (e.g., respond) with one or more outputs. Application 122 may merge the one or more outputs with the one or more inputs to produce a product, such as an insurance quote or an insurance policy.

As noted above, server 140, and the applications and/or processing engines executing thereon, may perform a variety of processing on behalf of one or more applications. In this regard, server 140 may be any computing device capable of performing the processes and algorithms described herein. Server 140 may be a stand-alone server, a corporate server, or a server located in a server farm or cloud-computing environment. According to some examples, server 140 may be a virtual server hosted on hardware capable of supporting a plurality of virtual servers. In some embodiments server 140 may provide services 142. Services 142 may include one or more applications and/or processing engines, such as quote engine 141, policy engine 143, claims engine 145, underwriting engine 147, and/or any equivalent thereof. Quote engine 141 may be a server-side application configured to provide a quote based on data and/or information (e.g., name, age, date of birth ("DOB"), state, social security number ("SSN"), etc.) provided by a user. Policy engine 143 may be another server-side application configured to generate a product (e.g., insurance policy) on behalf of a user and the data and/or information the user provides. In operation, the services may exchange (e.g., swap, share, etc.) the data and/or information provided by the user. Claims engine 145 may be another server-side application configured to process claims submitted by users. Finally, underwriting engine 147 may be configured to provide underwriting services based on the data and/or information provided by the user. In this regard, the canonical model may ensure that the data and/or information is formatted in a way that each of the processing engines (e.g., quote engine 141, policy engine 143, claims engine 145, underwriting engine 147, etc.) may process the data without having to transform the data and/or information. Following the canonical model may also improve a user's experience by ensuring that user data and/or information is entered only once. Furthermore, each of the processing engines (e.g., quote engine 141, policy engine 143, claims engine 145, underwriting engine 147, etc.) may access a single data entity (e.g., object) that contains the user data and/or information to ensure that the user's data and/or information is consistent throughout each stage of the product's lifecycle. As will be discussed in greater detail below, each of the one or more data entities that include the user's data and/or information may include a unique identifier, such as a universal resource identifier ("URI"). Accordingly, each of the processing engines (e.g., quote engine 141, policy engine 143, claims engine 145, underwriting engine 147, etc.) may obtain the data entity corresponding to the user data and/or information needed by the processing engine. In some embodiments, server 140 may be communicatively coupled to library 150 and develop portal 160.

Library 150 may be any suitable code repository. Library 150 may be co-located with server 140. Alternatively, library 150 may be a separate stand-alone server, corporate server, server located in a server farm or cloud-computing environment, and/or virtual server hosted on hardware capable of supporting a plurality of virtual servers. Library 150 may be configured as a digital distribution platform to provide a plurality of applications to a corporation and/or an enterprise. In some instances, the digital distribution platform may be hosted by a third party (e.g., external to the corporation and/or enterprise). Library 150 may also be configured to host and distribute a plurality of configuration files, application libraries, and the like. In some instances, library 150 may be configured to store canonical model 152 and/or legacy model 154. As noted above, canonical model 152 may be a standard schema that represents data entities (e.g., objects, classes, methods, libraries, etc.) and/or their relationships as a logical data structure across an enterprise and/or corporation. These data entities may be common to one or more business units. Canonical model 152 may also define a schema (c.a., format) for how inputs are obtained from applications. In some embodiments, canonical model 152 may be an XML schema, such as XML Schema Definition ("XSD"), Document Type Definitions ("DTD"), Document Structure Description ("DSD"), Document Content Description ("DCD"), Constraint Language in XML ("CLiX"), or any equivalent thereof. Additionally, canonical model 152 may store the collected user data and/or information in accordance with the standardized schema. Further, canonical model 152 may define the schema (e.g., format) for how data is outputted, either from services, such as services 142, or from applications, such as applications 112 and 122. In some embodiments, canonical data model 152 may be customized and/or updated to include new data entities. Additionally, or alternatively, library 150 may also store one or more legacy models, such as legacy model 154. Legacy model 154 may define one or more data structures representing data entities and the data fields for products supported by legacy model 154. Legacy model 154 may be a Document Object Model ("DOM") or any equivalent thereof.

Developer portal 160 may be logically and/or communicatively coupled to server 140 and library 150. Developer portal 160 may provide an interface for programmers and/or developers to create new data entities, generate new applications, and/or define, or update, the canonical model. Developer portal 160 may be configured to host development software. In this regard, developer portal 160 may be co-located with server 140, library 150, or both. Additionally, developer portal 160 may be a separate stand-alone server, corporate server, server located in a server farm or cloud-computing environment, and/or virtual server hosted on hardware capable of supporting a plurality of virtual servers. In some instances, developer portal 160 may be hosted by a third-party, such as GitHub®, SourceForge®, or the like.

Network 130 may include any type of network. In this regard, network 130 may include the Internet, a local area network (LAN), a wide area network (WAN), a wireless telecommunications network, a corporate network, a distributed corporate network, and/or any other communication network or combination thereof. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, WiMAX and LTE, is presumed, and the various computing devices described herein may be configured to communicate using any of these network protocols or technologies. The data transferred to and from various computing devices in system 100 may include secure and sensitive data, such as confidential documents, customers' personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in system 100 in front of one or more computing devices such that any external devices may communicate directly with the specialized hardware.

Figure 2:
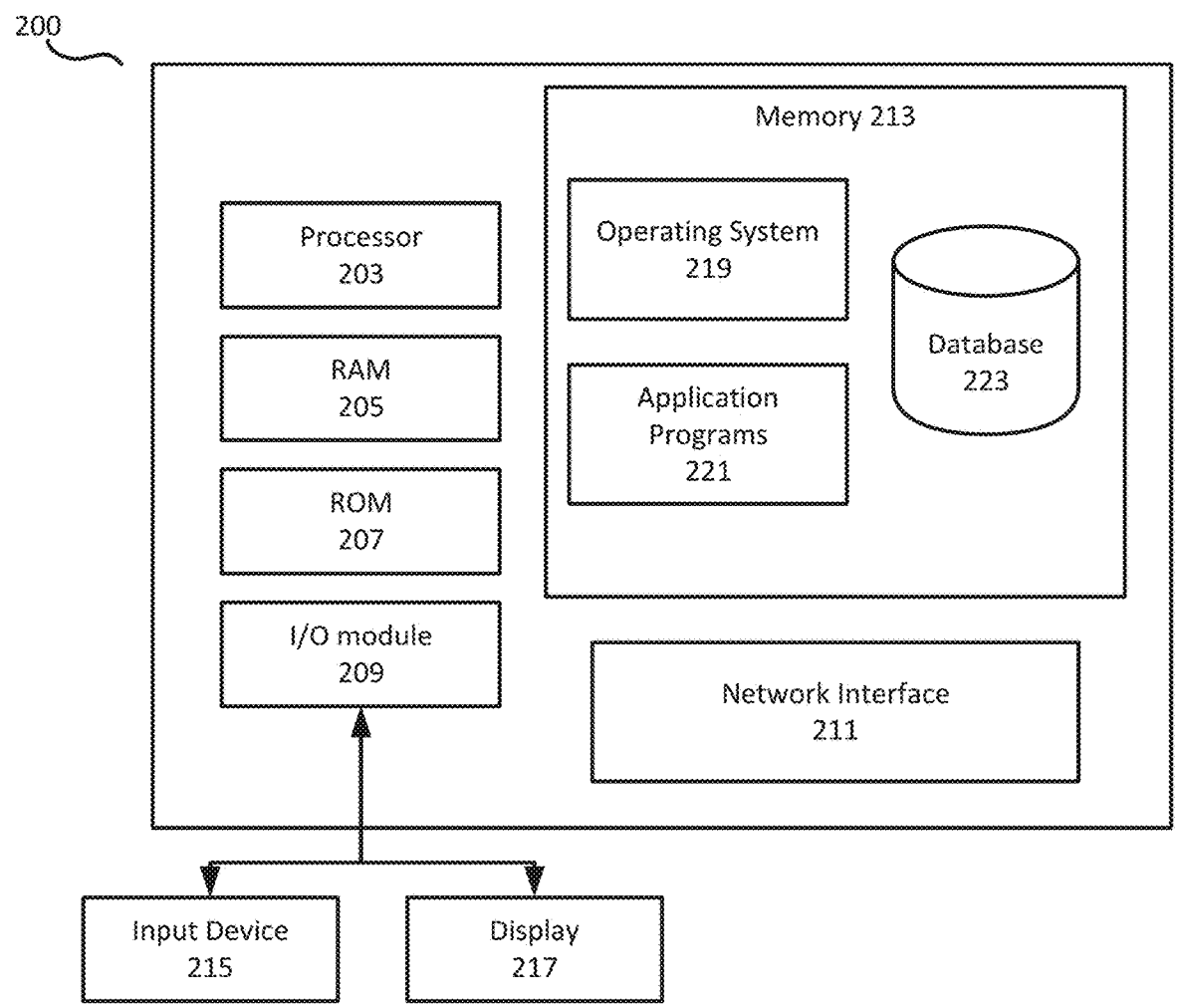
FIG. 2 shows an example of a computing device in accordance with one or more aspects described herein.

Any of the devices and systems described herein may be implemented, in whole or in part, using one or more computing systems described with respect to FIG. 2. FIG. 2 shows an example of a computing device 200. Computing device 200 may be similar to first computing device 110 and/or second computing device 120, discussed above. In this regard, computing device 200 may include one or more processors 203. Processor 203 may include a single central processing unit (CPU), which may be a single-core or multi-core processor. Alternatively, processor 203 may include multiple CPUs or a plurality of multi-core processors. Processor(s) 203 and associated components may allow the computing device 200 to execute a series of computer-readable instructions to perform some or all of the processes described herein. Processor(s) 203 may be capable of controlling operations of computing device 200 and its associated components, including RAM 205, ROM 207, an input/output (I/O) module 209, a network interface 211, and memory 213. For example, processor(s) 203 may be configured to read/write computer-executable instructions and other values from; to the RAM 205, ROM 207, and memory 213.

The I/O module 209 may be configured to be connected to an input device 215, such as a microphone, keypad, keyboard, touchscreen, and/or stylus through which a user of the computing device 200 may provide input data. The I/O module 209 may also be configured to be connected to a display device 217, such as a monitor, television, touchscreen, etc., and may include a graphics card. The display device 217 and input device 215 are shown as separate elements from computing device 200; however, they may be within the same structure.

The memory 213 may be any computer-readable medium for storing computer-executable instructions (e.g., software). The instructions stored within memory 213 may enable computing device 200 to perform various functions, including the processes, methods, and/or algorithms described herein. For example, memory 213 may store software used by computing device 200, such as an operating system 219 and application programs 221, and may include an associated database 223.

Although not shown in FIG. 2, various elements within memory 213 or other components in computing device 200, may include one or more caches, for example, CPU caches used by the processing unit 203, page caches used by the operating system 219, disk caches of a hard drive, and/or database caches used to cache content from database 223. For embodiments including a CPU cache, the CPU cache may be used by one or more processors in the processor 203 to reduce memory latency and access time. In such examples, the processor 203 may retrieve data from or write data to the CPU cache rather than reading/writing to memory 213, which may improve the speed of these operations. In some examples, a database cache may be created in which certain data from a central database such as, for example, a database associated with server 140 (e.g., a claims database, an underwriting database, insurance customer database, local information database, etc.) is cached in a separate smaller database on an application server separate from the database server. For instance, in a multi-tiered application, a database cache on an application server can reduce data retrieval and data manipulation time by not needing to communicate over a network with a back-end database server such as, for example, one or more servers 140. These types of caches and others may be included in various embodiments, and may provide potential advantages in certain implementations of retrieving and analyzing field data and/or local data, such as faster response times and less dependence on network conditions.

The network interface 211 may allow computing device 200 to connect to, and communicate with, a network, such as network 130. As noted above, network 130 may be any type of network, including a local area network (LAN) and/or a wide area network (WAN), such as the Internet, a cellular network, or satellite network. Through the network 130, computing device 200 may communicate with one or more other computing devices, such as server 140, library 150, and/or development portal 160, to exchange insurance-related data and/or information. The network interface 211 may connect to the network (e.g., network 130) via communication lines, such as coaxial cable, fiber optic cable, etc., or wirelessly using a cellular backhaul or a wireless standard, such as IEEE 802.11, IEEE 802.15, IEEE 802.16, etc. Further, the network interface 211 may use various protocols, including TCP/IP, Ethernet, File Transfer Protocol (FTP), Hypertext Transfer Protocol (HTTP), etc., to communicate with other computing devices, servers 140, and the like.

Figure 3:
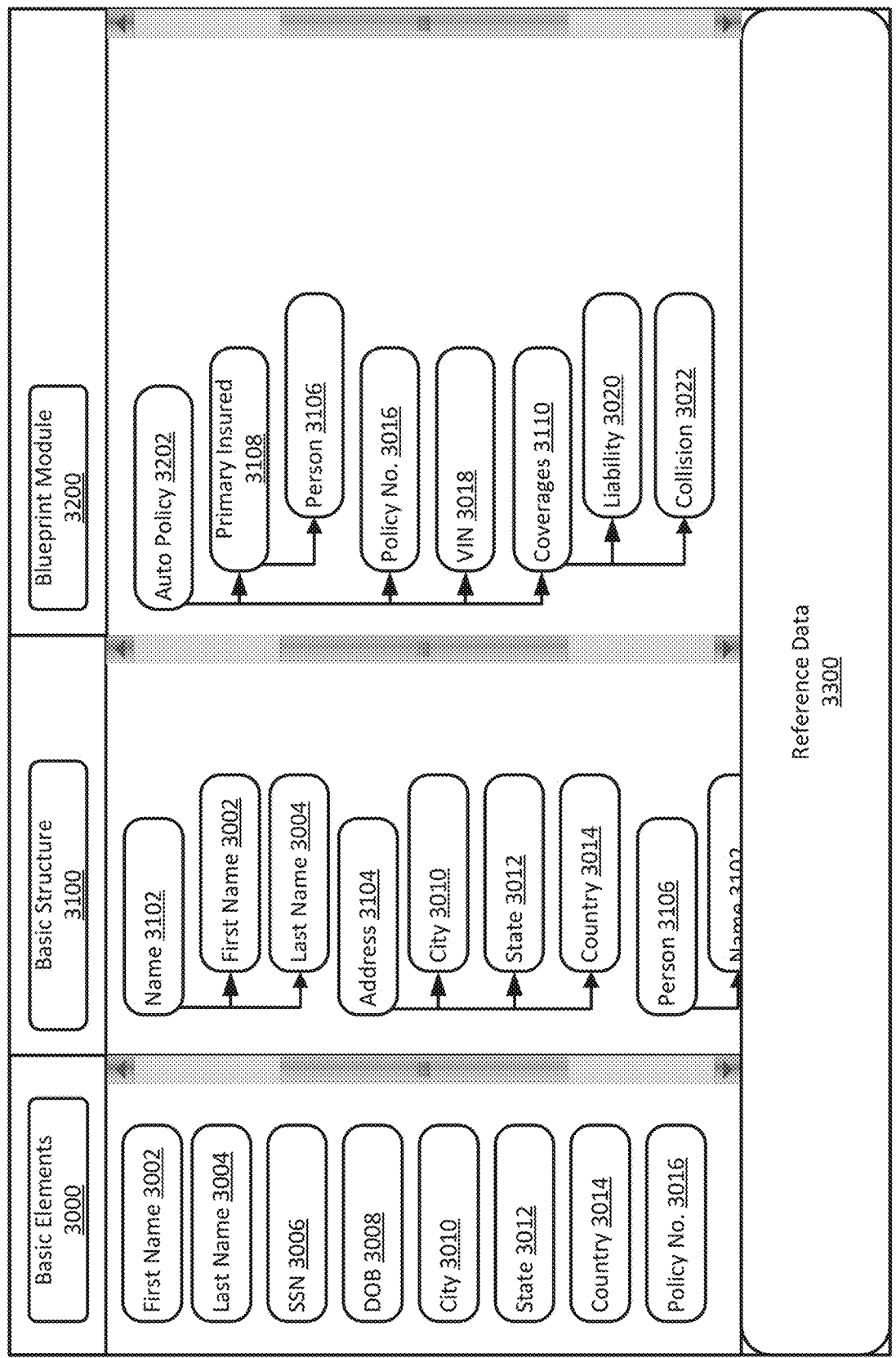
FIG. 3 shows an example of a canonical model according to one or more aspects of the disclosure.

As discussed above, an enterprise and/or corporation may create a canonical model to define a logical data structure that represents data entities (e.g., objects, classes, methods, libraries, etc.) and/or their relationships. FIG. 3 shows an example of a canonical model according to one aspect of the disclosure.

FIG. 3 illustrates a canonical model designed to represent data across an entire enterprise and/or corporation, and not simply limited to a traditional product offering, such as insurance products, or other products associated with the enterprise. As shown, the canonical model may categorize data and/or information into three categories: basic elements 3000, basic structure 3100, and blueprint module 3200. Additionally, the canonical model may include reference data 3300.

Basic elements 3000 may represent a unit of information. As shown in FIG. 3, basic elements may include first name 3002, last name 3004, social security number ("SSN") 3006, date of birth ("DOB") 3008, city of residence 3010, state of residence 3012, country of residence 3014, a policy number 3016, etc. It will be appreciated that these are merely illustrative and that any number of basic elements may be included in the field basic elements 3000. The basic elements may define attributes, entity names, data types, and a variety of other features of each basic element. For instance, first name 3002 may define an object (e.g., class) that contains a text-based variable defined in an array of a fixed length. Similarly, SSN 3006 may define an object (e.g., class) that contains a number-based variable of a fixed length (e.g., an array). Additionally, each object in basic elements 3000 may include a location identifier (e.g., URI, URL, etc.). The location identifier may be used by more complex objects to refer to the basic elements that comprise the complex object. In addition to containing information related to a user, basic elements 3000 may include product information. For instance, basic elements 3000 may define limits for certain products. For instance, basic elements may define a minimum liability coverage requirement for a particular state. Similarly, basic elements may include collision coverage requirement of the particular state. As will be discussed in greater detail below, basic elements 3000 may refer to reference data 3300 for state-mandated elements.

Basic structure 3100 may represent a more complex object (e.g., class) than basic elements 3000. As illustrated basic structure 3100 includes name 3102, address 3104, and person 3106. Name 3102 may include the basic elements first name 3002 and last name 3004. Similarly, address 3104 may include the basic elements: city 3010, state 3012, and country 3014. The incorporation of the basic elements may be accomplished by referring to the objects via the object's location identifier. Like basic elements, basic structures may also include location identifiers to be incorporated into more complex objects. For example, person 3106 may vary from name 3102 and address 3104 in that person 3106 refers to other basic structures. For example, person 3106 may refer to name 3102 and other information, such as address 3104, SSN 3006, DOB 3008, and the like (not shown in FIG. 3). Incorporating objects into various data structures by reference and/or by using the location identifier allows for data to stay up-to-date. That is, incorporating basic elements and/or data structures by reference may provide a bi-directional flow of data and/or information between the objects. For instance, if the basic element first name 3002 is updated, the update may flow to any data structure that incorporates first name 3002, such as name 3102. Similarly, if first name 3002 is updated in name 3102, the update may be reflected in the basic element: first name 3002.

Blueprint module 3200 may define one or more product offerings. As shown, blueprint module 3200 may define a product: auto policy 3202. Auto policy may include basic structures, such as primary insured 3108 and coverages. Primary insured 3108 may include another basic structure: person 3106. Similarly, the basic coverages 3110 may comprise two basic elements: liability 3020 and collision 3022. In addition to basic structures, auto policy 3202 may incorporate a number of basic elements, such as policy number 3016, and vehicle identification number ("VIN") 3018. Like the basic structures above, auto policy 3202 may incorporate the basic structures and basic elements by linking to the objects. This linking may be done through the use of a location identifier associated with each object (e.g., basic element, basic structure). As discussed above, incorporating basic elements and/or data structures by reference may provide a bi-directional flow of data and/or information between the objects. Accordingly, any changes made to any of the data and/or information contained in auto policy 3202 may be pushed to the underlying basic elements, and vice versa.

Reference data 3300 may include a variety of data related to laws and regulations that may define the objects in the products offered by the enterprise and/or corporation. For example, individual states may define minimum coverage for liability insurance for automobile insurance policies. The state laws and regulations may be defined by a basic element, such as state of residence 3012. In this regard, one basic element may be used to define another basic element. By including reference data, the enterprise and/or corporation may ensure that their product offerings comply with state and federal laws and regulations. Furthermore, incorporating reference data 3300 may propagate changes in laws and regulations to policies with de minimis user interaction. In this regard, the reference data may be linked to the data objects. Accordingly, when reference data is updated, the updates may be propagated to the data objects. Similarly, if data objects are updated, the updates may be propagated to the reference data 3300.

The canonical model may implement a plurality of rules to provide smoother integration of legacy and/or existing applications. For example, collection names may be defined in plural forms. Additionally, abbreviations for class names may be prohibited. By implementing the canonical model and several of the rules discussed herein, enterprises and/or corporations may support both legacy and future use cases, as well as be flexible to span multiple industries, products, and/or assets. In this regard, the canonical model may be designed to support model versioning, automatic schema generation in a variety of formats (e.g., JavaScript Object Notation ("JSON"), XML Schema Definition ("XSD"), etc.), output schema documentation (including glossary of terms for the subset, graphical representation of the model subset, and mapping documents), and support self-service schema extraction to enable implementation at scale. To provide this functionality and flexibility, the canonical model shown in FIG. 3 may allow for any node to be selected as a root node from which schemas may be generated, while keeping relationships between nodes intact. As mentioned above, these relationships may remain intact through the use of an identifier or location, such as a URI or a uniform resource locator ("URL"). The capability to implement any object as embedded or referenced may allow for the expansion of any implementation. For example, linking objects using the location identifiers described herein may allow for the data to be shared across applications. Additionally, implementing objects by reference or by embedding the objects ensures that the canonical model remains relatively flat (e.g., ≤4 levels), instead of hierarchical. By maintaining a relatively flat canonical model, the data contained therein may be accessed relatively quickly and without much difficulty. Furthermore, the relatively flat canonical model may support both data at rest and data in motion and versioning may be backwards compatible.

Figure 4:
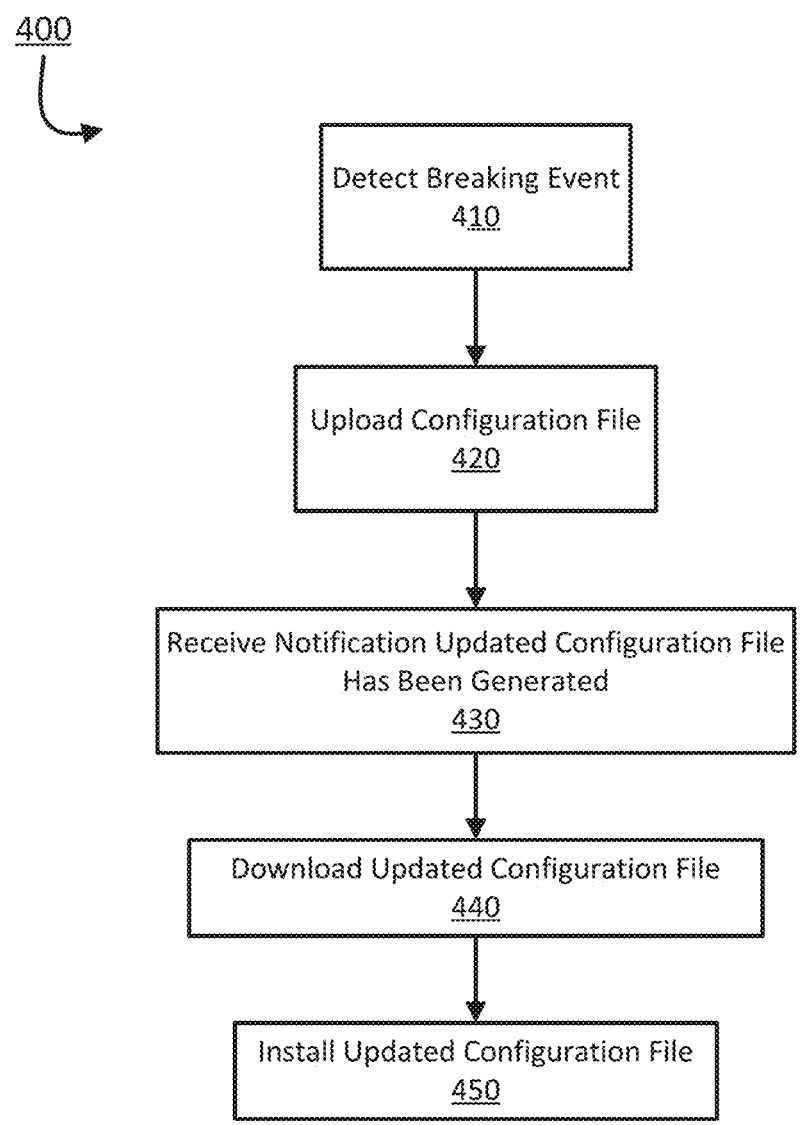
FIG. 4 shows an example of a process for updating an application configuration file according to one or more aspects of the disclosure.

Once the canonical model has been defined, applications and developers may create new applications that adhere to the canonical model. However, existing and/or legacy applications may need to be updated. FIG. 4 shows a flow chart of a process for updating a legacy application to adhere to the canonical model according to one or more aspects of the disclosure. Some or all of the steps of process 400 may be performed using one or more computing devices as described herein.

In step 410, a breaking event may be detected. The breaking event may be a modification to the schema structure, removal of data entities and/or attributes, renaming of an existing data entity and/or attribute, changing data types of existing attributes, and/or any other event that may cause the application and/or services to stop functioning. In this regard, the breaking event may be detected by the application, a server, services, and/or any other corporate entity that may interact with the application. In response to detecting a breaking event, the application may upload a configuration file in step 420. The configuration file may be an application-specific configuration file. The application-specific configuration file may define an application-specific schema. Uploading the configuration file may include checking-in the configuration file with a code repository, such as library 150 or a third-party code repository (e.g., GIT repository). As will be discussed in greater detail below, the configuration file may be updated and validated to ensure that the application-specific schema complies with the standardized schema defined by the canonical model discussed above. In step 430, the application may receive a notification that an updated configuration file has been updated. In some embodiments, the notification may be pushed to each of the applications. In other embodiments, the notification may be sent to an administrator to update the application. Preferably, the notification may indicate that the application needs to be updated. In step 440, the updated configuration file may be downloaded. This may be a manual process initiated in response to a user input to update the application. Alternatively, the update process may be performed automatically. For example, an administrator may push an update to each instance of the application. Additionally, or alternatively, the update may occur during a downtime, such as overnight. In step 450, the updated configuration file may be installed. Once installed, the application may comply with the canonical model described above.

Figure 5:
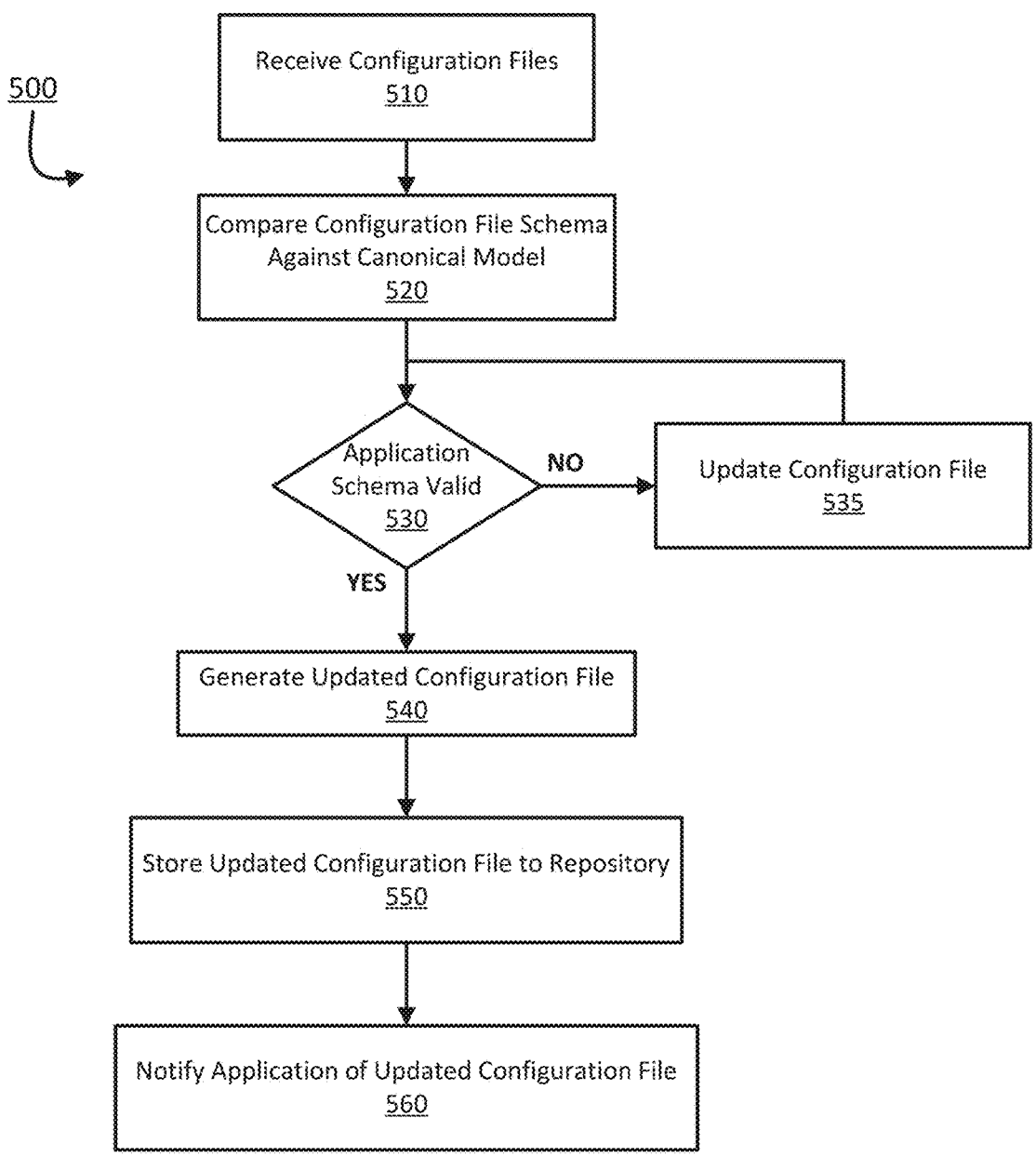
FIG. 5 shows an example of a process for updating and validating a configuration file according to one or more aspects of the disclosure.

Turning to FIG. 5, a flow chart of a process for updating and validating a configuration file according to one or more aspects of the disclosure is shown. Some or all of the steps of process 500 may be performed using one or more computing devices as described herein.

In step 510, configuration files may be received by an application. As noted above, the configuration file may be received in a repository, such as library 150 or a third-party code repository. In some embodiments, a notification may be sent to developer portal 160 that the configuration file has been uploaded. In step 520, the schema defined by the configuration file may compared to the canonical model. In this regard, a validation module may analyze the schema defined by the configuration file. The validation module may validate attribute names, entity names, datatypes, JSON path for attributes/properties, a root node, etc. The validation module may alert and/or notify developers of any potential issues, problems, and/or errors in the schema defined by the configuration file. Based on any issues, problems, and/or errors identified by the validation module, the schema defined by the configuration file may be updated accordingly. In step 530, the validation module may analyze the updated configuration file to determine whether the application schema is valid in comparison to the schema defined by the canonical model. In some embodiments, the validation module may be performed at compile time. Alternatively, the validation module may be executed at run time. When the validation module fails, any issues, problems, and/or errors may be identified. Accordingly, process 500 proceeds to step 535 where the configuration file may be further updated to ensure compliance with the schema defined by the canonical model. When validation is successful, process 500 may proceed to step 540 where an updated configuration file may be generated. The updated configuration file may include one or more model classes and/or libraries (e.g., DLL file, JAR file, etc.) for the application to install and/or update. In step 550, the updated configuration file may be stored in the repository. In preferred embodiments, the updated configuration file may be stored in the same location that the application uploaded the original configuration file. In step 560, the application may be notified that the updated configuration file has been stored in the repository. As noted above, the notification may be a push notification provided to the application. Additionally, or alternatively, the notification may be an electronic notification (e.g., email, text message, etc.) provided to a user and/or administrator. In some embodiments, the configuration file may be a push update or an equivalent therefore.

Figure 6:
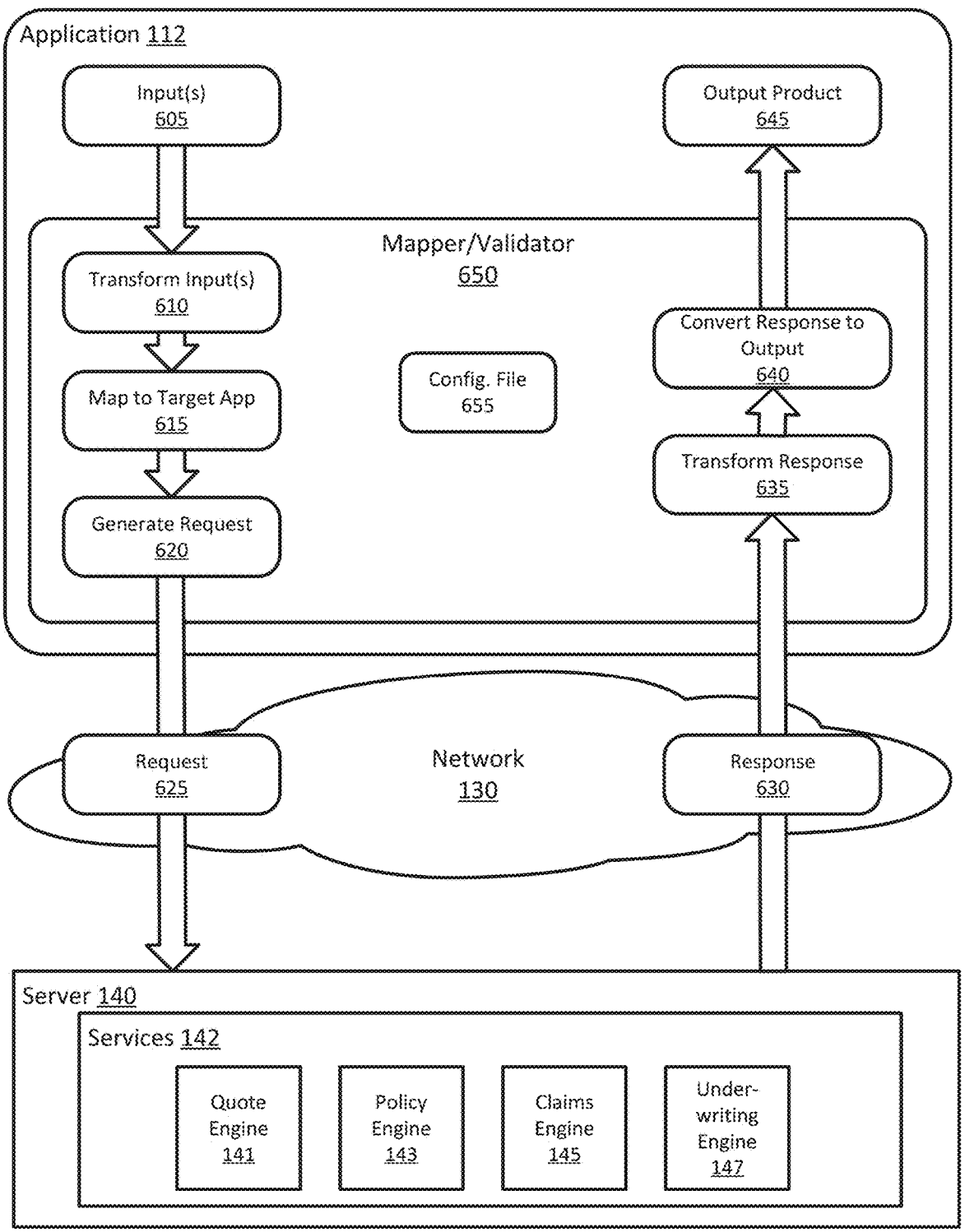
FIG. 6 shows an example of an application transforming data in accordance with the canonical model according to one or more aspects of the disclosure.

After updating the configuration file, a legacy application may be able to transform input data into the schema defined by the canonical model to communication with other applications and/or processing engines. FIG. 6 shows an example of a legacy application transforming data and/or information to adhere to the canonical model according to one or more aspects of the present disclosure.

FIG. 6 shows an example of a first computing device (e.g., application 112 executing on the first computing device) transforming input data into the schema defined by the canonical model and converting output in the canonical model schema into a schema that may be outputted via the application. The first computing device (e.g., application 112 executing on the first computing device) may obtain one or more inputs 605 from a user. For example, the user may input data and/or information in order to generate a product, such as an insurance quote, an insurance policy, process an insurance claim, and the like. The one or more inputs 605 may be obtained via an application interface, such as a user interface. In some instances, the user interface may be a web page. Alternatively, the user interface may be an application, such as an insurance application that is configured to obtain user data and/or information. The one or more inputs 605 may be in a first format, such as an XML format. In addition to user data and/or information, the one or more inputs 605 may identify a source application (e.g., application 112) and a target application (e.g., quote engine 141, policy engine 143, claims engine 145, underwriting engine 147, etc.). As noted above, the source application may be a web interface or an application. The target application, on the other hand, may be one or more services, applications, and/or processing applications. In this regard, the user may indicate that they would like to obtain an insurance quote. Accordingly, the one or more inputs 605 may identify quote engine 141 as the target application. Similarly, if the user would like to process a claim, the one or more inputs 605 may identify claims engine 145 as the target application.

Once the requisite user data and/or information has been obtained, the one or more inputs 605 may be passed to the mapper/validator module 650. The mapper/validator module 650 may determine whether the one or more inputs 605 need to be transformed. For example, the one or more inputs 605 may be transformed from a first format to a second format at 610. This transformation may be performed using a language configured to transform the one or more inputs 605. In the case of XML inputs, the transformation may be performed using eXtensible Stylesheet Language Transformations (XSLT). Accordingly, the one or more inputs 605 may be transformed from a first XML format into a second XML format. In some embodiments, the transformation of the one or more inputs 605 from the first format to the second format may reference configuration file 655.

After the one or more inputs 605 have been transformed (or, if the one or more inputs 605 did not need to be transformed), mapper/validator module 650 may map the one or more inputs 605 to the target application in block 615. As part of the mapping, mapper/validation module 650 may define each of the one or more inputs 605 in a format that the target application may understand. In some instances, configuration file 655 may assist in mapping the one or more inputs 605 for the target application. For example, configuration file 655 may serve as a reference guide to map the one or more inputs 655 for the target application. Once the mapping has occurred, the mapper/validator module 650 may generate the request to be transmitted to the server 140 via network 130 in block 620. Generating the request may include transforming the one or more inputs into a third format. For example, generating the request may comprise converting the one or more inputs 605 from an XML format into a data-interchange format, such as JSON, CSV, or any suitable format. The conversion may include serializing the one or more inputs 605 using a library, such as Newtonsoft. Once formatted, the request may be transmitted to the server 140 in block 625.

Server 140, and in particular one of the services 142, may process the request using the one or more inputs 605. As noted above, server 140 may parse the rest to determine the target application and provide the one or more inputs 605 to the appropriate target application for appropriate processing. To continue the examples above, server 140 may provide the user data and/or information to quote engine 141 if the user has requested an insurance quote. Further, server 140 may provide the user data and/or information to claims engine 145 as the target application when the user has requested to process an insurance claim. The target application may generate one or more outputs. For instance, quote engine 141 may provide an insurance quote based, in part, on the one or more inputs 605 (e.g., user data and/or information). Similarly, claims engine 145 may generate and provide claim information based on the one or more inputs 605 (e.g., user data and/or information). The one or more outputs may be formatted according to a data-interchange format (e.g., JSON, CSV, etc.) and transmitted to application 112 in response in block 630.

Upon receiving the response, the first computing device (e.g., application 112 executing on the first computing device) may transform the response into a format usable by application 112 in block 635. In some instances, the response may be deserialized using a library, such as Newtonsoft. Additionally, or alternatively, the response may be converted from the data-interchange format into a format usable by the application. In this regard, application may convert a JSON response into an XML format. Additionally, the response may identify the source and target applications. In some embodiments, the source and target applications may be the same as they were in the one or more inputs. In other embodiments, the source and target applications may be inverted from how they appeared in the request. Accordingly, the source application may be identified as one of the services 142 and the target application may be the application interface which originally received the one or more inputs 605. After transforming the format of the response, mapper/validator module 650 may transform the format of the one or more outputs into a format for the end product at block 640.

The transformation may be the inverse of the one performed above. In this regard, mapper/validator 650 may transform the format of the response using XSLT. In this regard, the one or more outputs may be transformed from the second XML format into the first XML format. In some embodiments, the transformation of the one or more outputs may reference configuration file 655. Additionally, or alternatively, the one or more outputs may be mapped to the target output application. As noted above, mapper/validation module 650 may translate each of the one or more outputs on behalf of the target output application. Configuration file 655 may assist in mapping the one or more outputs for the target output application. Once the one or more outputs are properly formatted, mapper/validator module 650 may pass the information to application 112, which may output the product in block 645. In this regard, application 112 may obtain the one or more outputs from mapper/validator module 650 and merge them with an output document. For instance, the one or more outputs may include an insurance quote. The first computing device (e.g., application 112 executing on the first computing device) may merge the insurance quote in a quote document that contains the one or more inputs 605 (e.g., user data and/or information), as well as the insurance quote. Similarly, the one or more outputs may include claim information. The first computing device (e.g., application 112 executing on the first computing device) may merge the claim information in a claim document that includes the one or more inputs 605 and the claim information. The output may then be provided to the user, for example, via a display and/or as a printout.

By updating an application to adhere to a canonical model, the first computing device (e.g., application 112 executing on the first computing device) may be able to transform data and/or information to a standardized format as the data and/or information flows between applications.

Figure 7A:
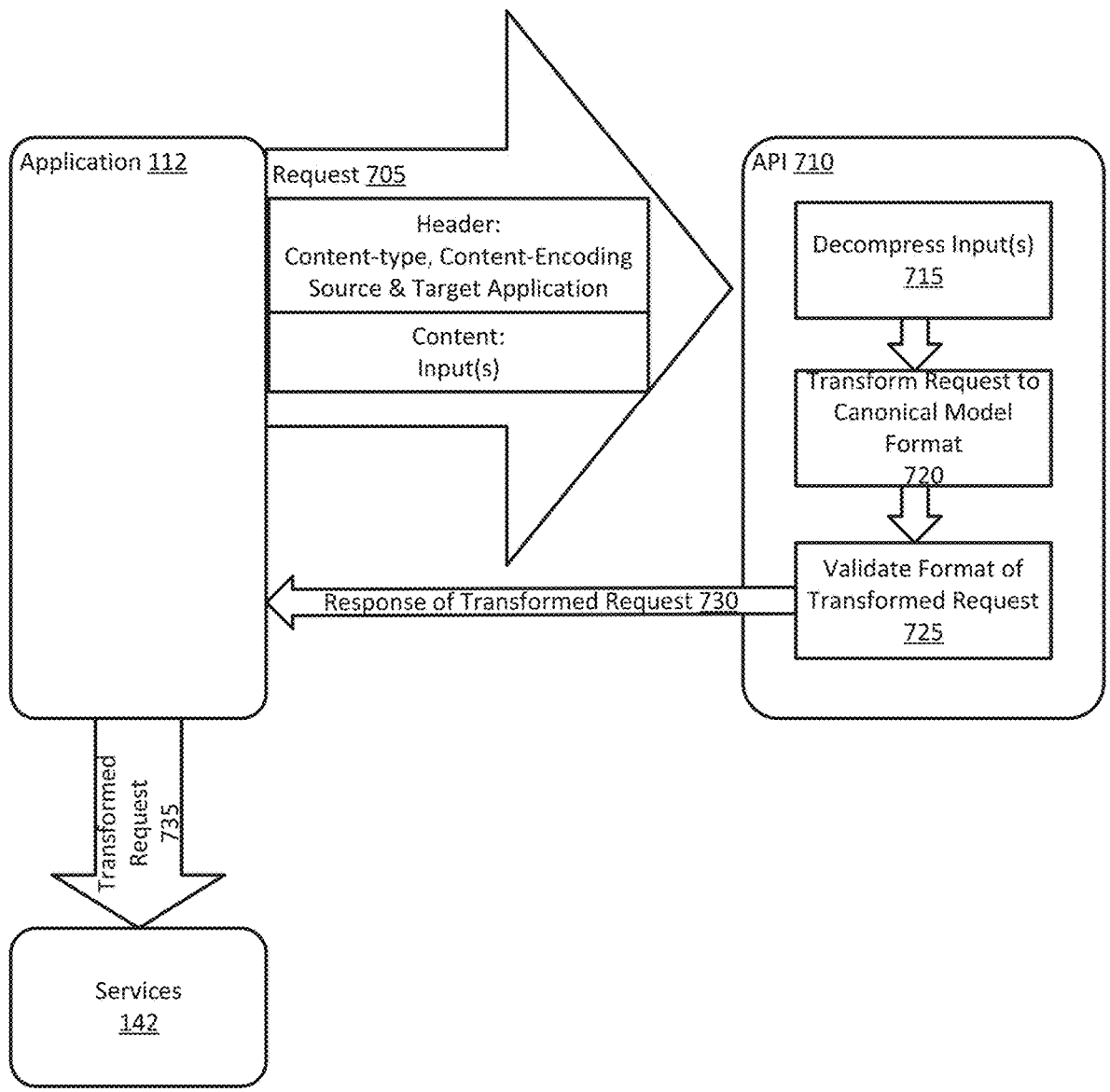
FIGS. 7A and 7B show an example of an application programming interface ("API") for transforming data and/or information according to one or more aspects of the disclosure.
Figure 7B:
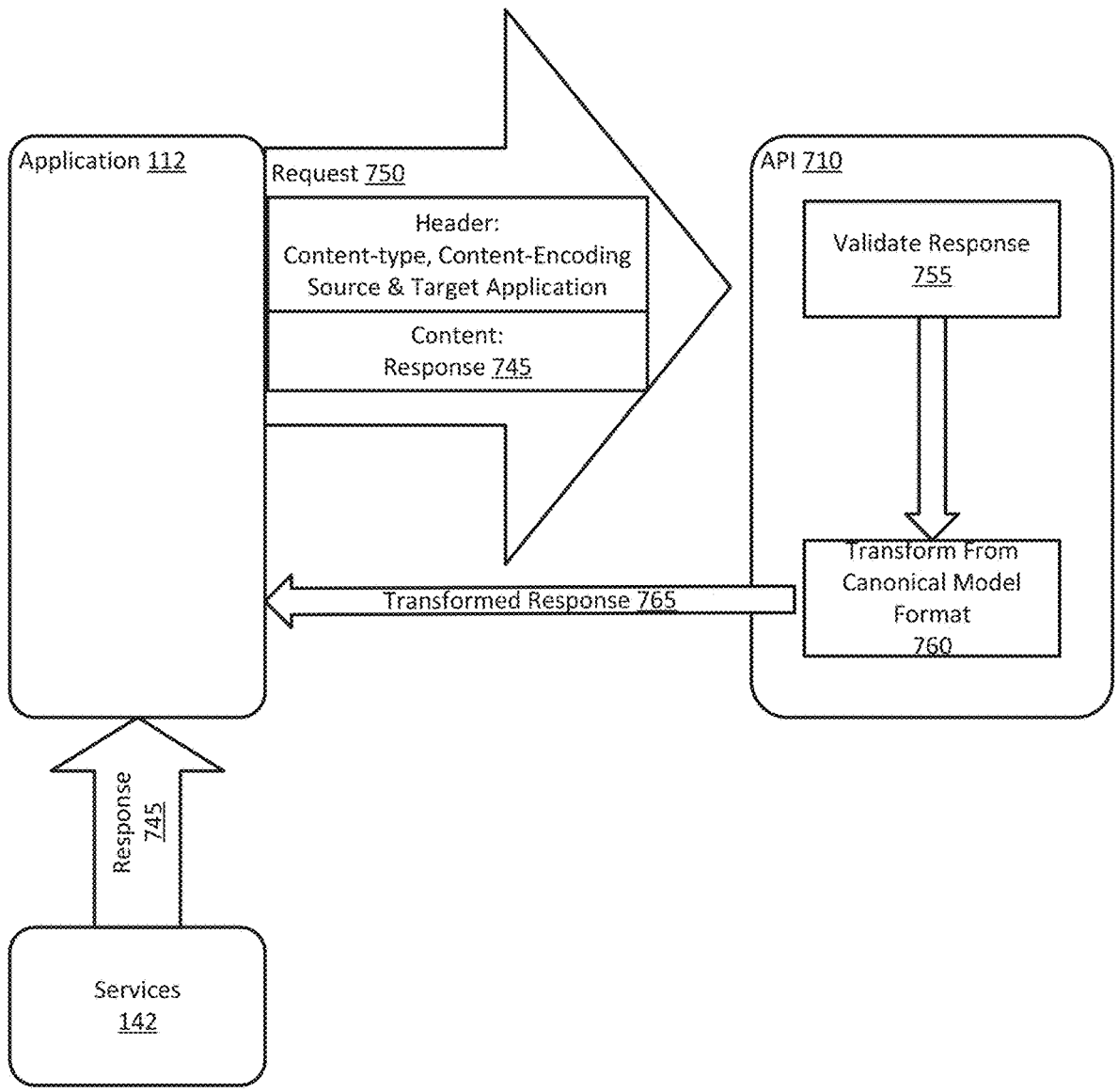

These transformations minimize inconsistent formatting, data duplication, and/or data corruption, thereby improving the overall performance of the processing system by reducing computation cycles and memory requirements.

in some instances, the configuration file of some applications may not be capable of being updated and/or reconfigured to comply with the schema defined by the canonical model. Accordingly, the applications may access an application programming interface ("API") that formats data and/or information in accordance with the canonical model. FIGS. 7A and 7B show an example of an application programming interface ("API") for transforming data and/or information according to one or more aspects of the disclosure.

FIGS. 7A and 7B show application 112, API 710, and services 142. As noted above, application 112, API 710, and services 142 may be interconnected via a network, such as network 130. Application 112 may receive one or more inputs that may be processed by one of the services 142. However, application 112 may recognize that the one or more inputs do not comply with the standardized schema defined by the canonical model. Accordingly, application 112 may transmit a request, such as request 705, to API 710. The request may include a header and content. The header may include a content-type, a content encoding, source and target application information, etc. The content may include one or more inputs. The one or more inputs may be in a first format, such as an XML format. In some embodiments, the request may be compressed to conserve network bandwidth. In some instances, the payload (e.g. content) may be compressed.

API 710 may receive request 705 from application 112. In block 715, API 710 may decompress the one or more inputs. After decompressing the one or more inputs, API 710 may transform the request into the format defined by the canonical model at 720. As discussed above with respect to FIG. 6, the transformation may be performed by a mapper/validation module. In this regard, the transformation may include transforming the one or more inputs from a first format to a second format, mapping the one or more inputs (in the second format) to the target application, and transforming the second format into a transmittable format (e.g., a JSON). In block 725, API 710 may validate the format of the transformed request. The validation step may be similar to the validation step discussed above with respect to FIG. 5. When the transformed request passes validation, the formatted request may be transmitted to application 112 at 730, which, in turn, transmits the formatted request to one of the services 142 in block 735.

Turning to FIG. 7B, one of the services 142 may transmit a response to application 112 in block 745. As noted above, the response may be formatted in accordance with the standardized schema defined by the canonical model. Application 112 may not be able to process the response as formatted. Accordingly, application 112 transmits request 750 to API 710. Request 710 may, again, include a header and content. The header information may remain unchanged. However, the content information may include response 745. In block 755, API 710 may validate the response. The validation performed in block 755 may be similar to the previously discussed validation procedures. When the response has been validated, API 710 may transform the response from the standardized format defined by the canonical model to a format (e.g., XML) usable by application 112 at 760. In block 765, the transformed response may be transmitted from API 710 to application 112. Application 112 may use the transformed response to generate a product an insurance quote, an insurance policy, claim information, etc.) for a user.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although many example arrangements described herein are discussed in the context of insurance applications, aspects described herein may be used in different industries and for different applications or products without departing from the invention. Further, although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A method comprising:
   receiving, at a computing device, one or more inputs, wherein the one or more inputs are in a first format;
   validating the first format of the one or more inputs to determine whether the one or more inputs comply with a schema defined by a canonical model;
   transforming the first format of the one or more inputs into a second format based on a determination that the first format of the one or more inputs does not comply with the schema;
   generating a request using the one or more inputs in the second format, wherein the request comprises a serialized format of the one or more inputs;
   transmitting, to a processing engine, the request;
   receiving a response from the processing engine, wherein the response comprises one or more outputs;

converting the one or more outputs into the second format by deserializing the response;
transforming the one or more outputs from the second format to the first format; and
generating a product by merging the one or more inputs and the one or more outputs.

2. The method of claim 1, further comprising:
decompressing the one or more inputs prior to validating the first format of the one or more inputs to determine whether the one or more inputs comply with the schema defined by the canonical model.

3. The method of claim 1, wherein validating the first format of the one or more inputs further comprises:
determining whether the one or more inputs comply with a version of the schema defined by the canonical model.

4. The method of claim 1, wherein transforming the first format of the one or more inputs into the second format further comprises:
mapping, using a configuration file, a first input of the one or more inputs to an input associated with the second format.

5. The method of claim 1, wherein the first format comprises an application-specific schema.

6. The method of claim 1, wherein the second format comprises a format associated with a target application.

7. The method of claim 1, wherein the request further comprises at least one of:
a content type;
a content encoding;
a source application identifier; or
a target application identifier.

8. The method of claim 1, further comprising:
validating the request prior to transmitting the request to the processing engine.

9. The method of claim 1, wherein transforming the one or more outputs from the second format to the first format further comprises:
mapping a first output of the one or more outputs to an output associated with the first format, the first output mapped to the output using a configuration file and previously stored mapping information.

10. The method of claim 1, wherein the one or more outputs comprise a product offering generated from one or more data objects associated with the canonical model.

11. A system comprising:
a computing device in communication with a server, the computing device is configured to:
receive one or more inputs, wherein the one or more inputs are in a first format;
validate the first format of the one or more inputs to determine whether the one or more inputs comply with a schema defined by a canonical model;
transform the first format of the one or more inputs into a second format based on a determination that the first format of the one or more inputs does not comply with the schema;
generate a request using the one or more inputs in the second format, wherein the request comprises a serialized format of the one or more inputs;
transmit the request to a server;
receive a response from the server, wherein the response comprises one or more outputs;
convert the one or more outputs into the second format by deserializing the response;
transform the one or more outputs from the second format to the first format; and
generate a product by merging the one or more inputs and the one or more outputs.

12. The system of claim 11, wherein the server comprises a plurality of services, wherein one of the plurality of services receives the request and generates the response.

13. The system of claim 11, wherein the server comprises a database, wherein the response is generated using the database.

14. The system of claim 11, wherein the computing device is further configured to receive a configuration file that defines one or more parameters for determining whether the one or more inputs comply with the schema defined by the canonical model.

15. The system of claim 14, wherein the configuration file is received via a push from a second server.

16. The system of claim 11, wherein the product comprises at least one of: an insurance policy or an insurance quote.

17. A non-transitory computer-readable medium comprising instructions, that when executed by one or more processors, cause a computing device to:
receive one or more inputs, wherein the one or more inputs are in a first format wherein the first format comprises an application-specific schema;
validate the first format of the one or more inputs to determine whether the one or more inputs comply with a schema defined by a canonical model;
transform the first format of the one or more inputs into a second format based on a determination that the first format of the one or more inputs does not comply with the schema by mapping a first input of the one or more inputs to an input associated with the second format using a configuration file, wherein the second format comports with the canonical model;
generate a request using the one or more inputs in the second format, wherein the request comprises one or more of a content type, a content encoding, a source application identifier, a target application, identifier, or a serialized format of the one or more inputs;
transmit the request to a server;
receive a response from the server, wherein the response comprises one or more outputs;
convert the one or more outputs into the second format by deserializing the response;
transform the one or more outputs from the second format to the first format by mapping a first output of the one or more outputs to an output associated with the first format using the configuration file; and
generate a product by merging the one or more inputs and the one or more outputs.

18. The non-transitory computer readable medium of claim 17, wherein the server comprises one or more processing engines.

19. The non-transitory computer readable medium of claim 17, wherein the instructions further cause the computing device to:
decompress the one or more inputs prior to validating the first format of the one or more inputs to determine whether the one or more inputs comply with the schema defined by the canonical model.

20. The non-transitory computer readable medium of claim 17, wherein the one or more outputs comprise a product offering generated from one or more data objects associated with the canonical model.

* * * * *